United States Patent [19]
Bloomfield

[11] Patent Number: 6,068,673
[45] Date of Patent: *May 30, 2000

[54] ELECTROCHEMICAL HYDROGEN COMPRESSOR WITH ELECTROCHEMICAL AUTOTHERMAL REFORMER

[75] Inventor: David P. Bloomfield, Boston, Mass.

[73] Assignee: Niagara Mohawk Power Corporation, Syracuse, N.Y.

[*] Notice: This patent is subject to a terminal disclaimer.

[21] Appl. No.: 09/112,486

[22] Filed: Jul. 9, 1998

Related U.S. Application Data

[63] Continuation-in-part of application No. 08/893,144, Jul. 15, 1997, Pat. No. 5,900,031.

[51] Int. Cl.$^7$ ............................... B01J 7/00; B01J 8/00; C10J 1/28; C10K 1/28
[52] U.S. Cl. ..................... 48/197 R; 48/61; 48/127.9; 48/197
[58] Field of Search ................. 48/127.9, 61, 197 R, 48/197

[56] References Cited

U.S. PATENT DOCUMENTS

| | | | |
|---|---|---|---|
| 3,447,288 | 6/1969 | Juda et al. | 96/11 |
| 3,616,334 | 10/1971 | Aker et al. | 204/265 |
| 4,081,337 | 3/1978 | Spitzer | 205/338 |
| 4,288,301 | 9/1981 | Hart | 205/555 |
| 4,290,858 | 9/1981 | Engelhaupt | 205/50 |
| 4,314,984 | 2/1982 | Lawson et al. | 423/579 |
| 4,391,682 | 7/1983 | Struck et al. | 205/554 |
| 4,412,895 | 11/1983 | Lu | 205/637 |
| 4,810,485 | 3/1989 | Marianowski et al. | 423/648.1 |
| 5,019,227 | 5/1991 | White et al. | 205/617 |
| 5,141,604 | 8/1992 | Ayers | 205/637 |
| 5,215,729 | 6/1993 | Buxbaum | 423/248 |
| 5,354,547 | 10/1994 | Rao et al. | 423/650 |
| 5,366,712 | 11/1994 | Violante et al. | 423/248 |
| 5,451,386 | 9/1995 | Collins et al. | 423/237 |
| 5,900,031 | 5/1999 | Bloomfield | 48/197 R |

*Primary Examiner*—Marian C. Knode
*Assistant Examiner*—Alexa A. Doroshenk
*Attorney, Agent, or Firm*—Wall Marjama Bilinski & Burr

[57] ABSTRACT

A hydrogen production plant includes an electrochemical autothermal reformer (EATR) that provides hydrogen to an electrochemical hydrogen compressor. The EATR includes an autothermal reformer region, a mixed ion conductor membrane or metal or metal alloy membrane, and an anode supply region. An anode gas loop between the anode supply region of the EATR and anode section of the electrochemical hydrogen compressor cell circulates a mixture of hydrogen and a carrier gas therebetween. The carrier gas ensures proper partial pressures of hydrogen in the two regions. A difference in operating temperature between the EATR and the electrochemical hydrogen compressor is exploited by heat exchangers which efficiently enable certain heating and cooling functions within the combined system.

10 Claims, 2 Drawing Sheets

ELECTROCHEMICAL HYDROGEN COMPRESSOR WITH ELECTROCHEMICAL AUTOTHERMAL REFORMER

CROSS REFERENCE TO RELATED APPLICATION

This is a Continuation-In-Part of U.S. Ser. No. 08/893,144, filed Jul. 15, 1997, the entirety of which is incorporated herein by reference now U.S. Pat. No. 5,900,031 issued May 4, 1999.

BACKGROUND OF THE INVENTION

This invention relates to a hydrogen production plant using a reformer to supply hydrogen to a hydrogen compressor, and in particular, to a hydrogen production plant using an electrochemical autothermal reformer (EATR) to provide hydrogen fuel to an electrochemical hydrogen compressor (EHC).

An EHC is essentially a fuel cell operated in reverse. A fuel cell is an electrochemical cell that converts the chemical energy of a fuel directly into electric energy in a continuous process. The fuel cell's overall reaction typically involves the combination of hydrogen with oxygen to form water. For example, at 25° C. and 1 atm pressure, the reaction $H_2 + \frac{1}{2}O_2 \rightarrow H_2O$ takes place with a free energy change ($\Delta G$) of −56.69 kcal/mole. In a galvanic cell, this reaction produces a theoretical cell voltage of 1.23 volts. Actual values are typically within the range of 0.9 to 1.1 volts. The main types of fuel cells used today are the proton exchange membrane or solid polymer electrolyte fuel cell, phosphoric acid fuel cell, alkaline fuel cell, solid oxide fuel cell, and molten carbonate fuel cell. Details on these individual technologies is found in "Fuel Cells, A Handbook (Revision 3)" published January, 1994 by the U.S. Department of Energy Office of Fossil Energy, incorporated herein in its entirety by reference.

The EHC is an electrochemical cell that converts electric energy directly to chemical energy in a continuous process. Instead of placing a load across the anode and cathode sections in a fuel cell to produce electricity, in the EHC, an external power supply is placed across the anode and cathode sections to reverse the process. Hydrogen accumulates in the cathode. Thus, an EHC needs two major inputs to function: hydrogen from a source and an externally applied voltage.

OBJECTS AND SUMMARY OF THE INVENTION

An object of the present invention is to provide a system that reforms a hydrocarbon fuel to produce hydrogen for use in an electrochemical hydrogen compressor (EHC).

A further object of the present invention is to use an electrochemical autothermal reformer to function as a hydrogen production plant in conjunction with an electrochemical hydrogen compressor.

Briefly stated, a hydrogen production plant includes an electrochemical autothermal reformer (EATR) that provides hydrogen to an electrochemical hydrogen compressor. The EATR includes an autothermal reformer region, a mixed ion conductor or membrane layer, and an anode supply region. The mixed ion conductor or membrane layer separates the autothermal reformer region from the anode supply region. An anode gas loop between an anode supply side or region of the EATR and an anode compartment or section of the electrochemical hydrogen compressor cell circulates a mixture of hydrogen and a carrier gas. The carrier gas ensures that the partial pressure of hydrogen in the anode gas loop remains low relative to the hydrogen partial pressure in the ATR region of the EATR. A difference in operating temperature between the EATR and the EHC is exploited by heat exchangers which efficiently enable certain heating and cooling functions within the combined system.

According to an embodiment of the invention, a hydrogen production plant includes an electrochemical autothermal reformer for use in conjunction with an electrochemical hydrogen compressor, the compressor comprising a compressor anode compartment or section and a compressor cathode compartment or section, the electrochemical autothermal reformer comprising an autothermal reformer region, a mixed ion conductor or membrane layer, and an anode supply region. The mixed ion conductor or membrane layer separates the autothermal reformer region from the anode supply region, and a circulating means is used for circulating a mixture of hydrogen and a carrier gas between the anode supply region of the EATR and the compressor anode section.

According to an embodiment of the invention, a hydrogen production plant includes an electrochemical autothermal reformer that provides hydrogen to an electrochemical hydrogen compressor, the electrochemical autothermal reformer comprising an autothermal reformer region, a mixed ion conductor or membrane layer, and an anode supply region. The mixed ion conductor separates the autothermal reformer region from the anode supply region, and a circulating means is used for circulating a mixture of hydrogen and a carrier gas between the compressor anode section and the anode supply region of the EATR. Other features include a burning means for burning excess hydrogen from the autothermal reformer exhaust region, a fuel feeding means for feeding a hydrocarbon fuel to the autothermal reformer region, and a control means, responsive to the burning means, for controlling the fuel feeding means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
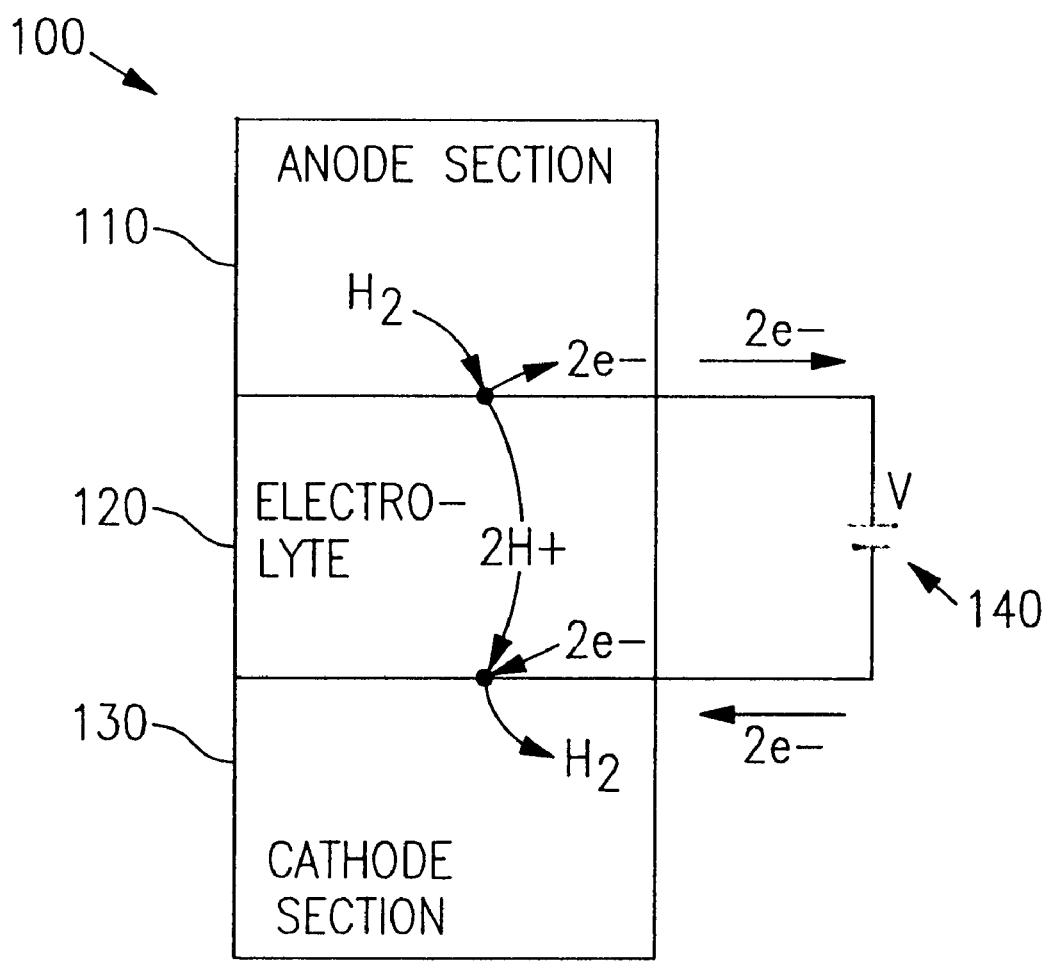
FIG. 1 illustrates an electrochemical hydrogen compressor, used in accordance with a preferred embodiment of the present invention.

Referring to FIG. 1, an electrochemical hydrogen compressor (EHC) 100 includes an anode section 110 and a cathode section 130 separated by an electrolyte 120. Two electrons are stripped from the hydrogen molecule in the anode section 110 and sent to the cathode section 130 by an external power source 140. The resulting protons produced at anode section 110 diffuse through the electrolyte 120 which is sufficiently porous, a membrane, and eventually go to the adjacent cathode section 130, so as to recombine there with the associated electrons from the external power source 140, and form the hydrogen molecule. The formed hydrogen molecule can be released from cathode section 130 at any pressure. Unlike a fuel cell, no oxygen is provided to the cathode section 130 of the EHC. The hydrogen in anode section 110 is driven through electrolyte 120 by the external power source applied sufficient to overcome pressure and polarization of the hydrogen in cathode section 130.

Figure 2:
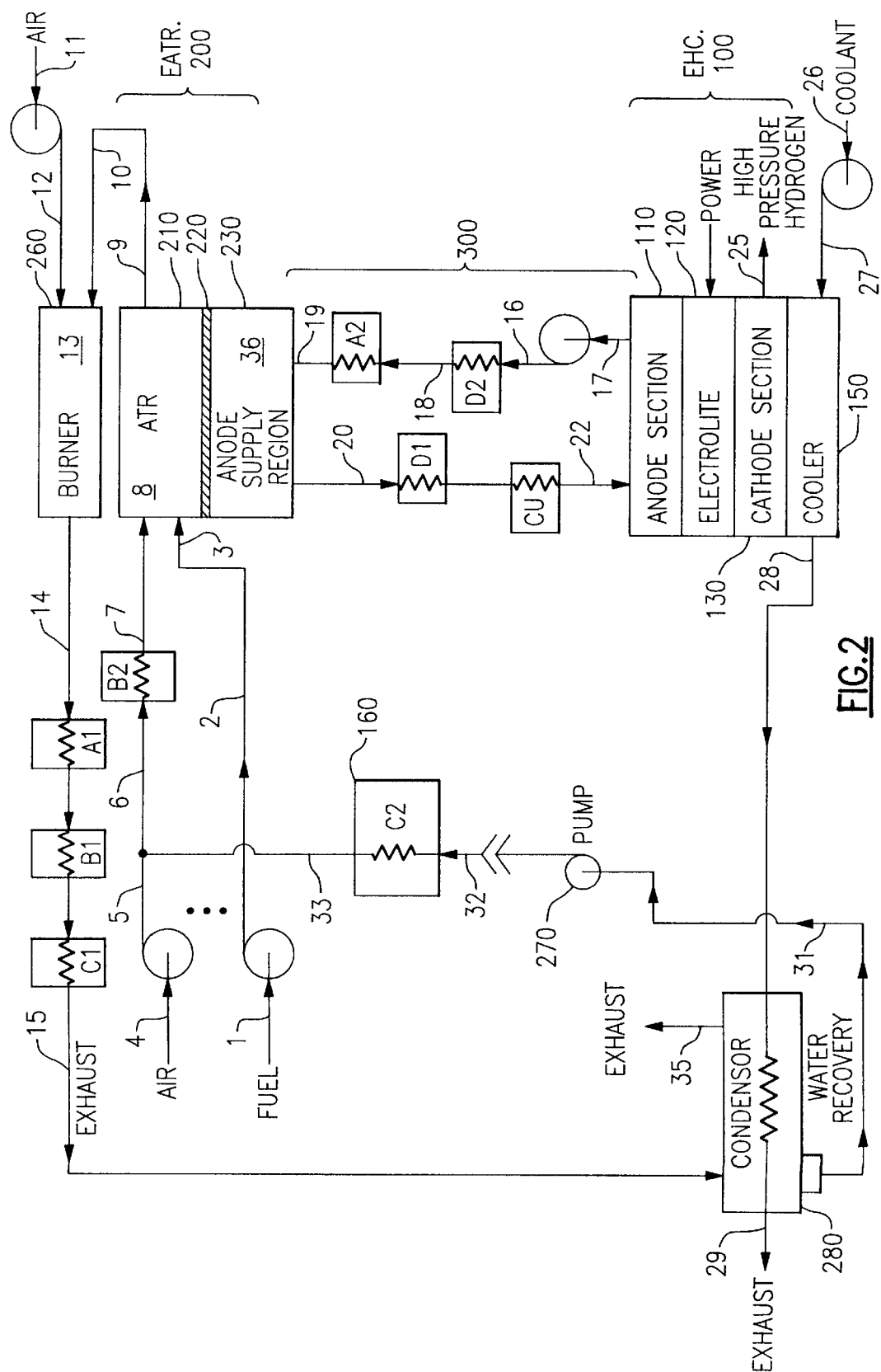
FIG. 2 is a schematic diagram of a power plant according to the present invention.

Referring to FIG. 2, an EATR (Electrochemical Auto-Thermal Reformer) 200 includes an ATR (AutoThermal Reformer) 210 joined to an anode supply region 230 by a membrane layer 220. Membrane layer 220 is a mixed ion conductor. A "reformer" is a known device in which a hydrocarbon fuel is mixed with steam, in the presence of a catalyst, to convert the fuel/steam mixture to hydrogen, carbon monoxide, carbon dioxide, water, and impurities. Since most known reformers are sensitive to the presence of impurities, impurities such as sulfur are generally removed from the fuel before entering the reformer. An electrochemical autothermal reformer combines the principles of electrochemical hydrogen separation and autothermal reforming in tandem. The purpose of the electrochemical autothermal reformer is to effect the selective removal of hydrogen from an autothermal reforming zone of an EATR so as to drive the reforming reaction to completion while separating the hydrogen component for other use.

The functioning of EATR 200 along with the composition of membrane layer 220 is the subject of a copending application filed concurrently herewith entitled "ELECTROCHEMICAL AUTOTHERMAL REFORMER" (attorney docket no. 269-005) and incorporated herein by reference. The membrane 220 may be ceramic, as in the above referenced application, or a metal or metal alloy which is permeable to hydrogen, as set forth in U.S. Pat. No. 5,215,729, which is also incorporated herein by reference. The hydrogen produced by EATR 200 is used to feed EHC 100 as explained further below.

Still referring to FIG. 2, EATR 200 is fed with a hydrocarbon fuel stream from node 1 and an air stream from node 4. The air is mixed with steam, from a boiler 160, indicated at node 33 to form an air/steam mixture. The air/steam mixture is heated in heat exchanger B2 between node 6 and node 7 prior to entering ATR 210. ATR 210 operates at temperatures from about 80° F. to about 2500° F., while EHC anode section 110 operates from about 70° F. to about 200° F. depending on pressure.

A low hydrogen partial pressure in the anode supply region 230 side of EATR 200 is preferable along with a higher partial pressure of hydrogen in the ATR 210 side of EATR 200. In this situation, hydrogen is transferred via membrane layer 220 from ATR 210 to anode supply region 230. That portion of hydrogen which does not pass through the membrane layer 220, leaves ATR 210 at node 9, along with unreacted fuel or carbon monoxide, and enters burner 260 at node 10 where it is combusted after being mixed with air entering burner 260 at node 12. Combustion exhaust passes through a plurality of heat exchangers A1/A2, B1/B2, and C1/C2 before reaching a condenser 280 where water is removed. Heat is transferred from A1, B1, and C1 to other parts of the system. Heat from heat exchanger B1 is preferably used to heat the air/steam mixture (in heat exchanger B2) described above between nodes 6 and 7. Heat from heat exchanger C1 is preferably used in boiler 160 (C2). The use of the heat from heat exchanger A1 is described below.

An anode gas loop 300 circulates between anode section 110 of EHC 100 and anode supply region 230 of EATR 200. A gas mixture of hydrogen and a carrier gas leaves anode section 110 at node 17 with a low hydrogen partial pressure, since most of the hydrogen has been removed through electrolyte 120 by external power source 140 to cathode section 130. The carrier gas is preferably any inert gas which does not poison EHC anode section 110 or pass through electrolyte 120, or any vapor which does not poison EHC 100. Such carriers include steam or inert gasses, such as argon or nitrogen. A heat exchanger D1/D2 transfers heat from a hot side of anode gas loop 300 (D1) to a cold side of anode gas loop 300 (D2). A heat exchanger CU transfers heat from the hot side of anode loop 300 to act as a heat source for use outside the system. Heat exchanger A1/A2 transfers heat from burner 260 via heat exchanger A1 to the hot side of A2 in anode loop 300.

The gas mixture from the anode section of the EHC enters heat exchanger D1/D2 at node 16 and is heated. The gas mixture then enters heat exchanger A1/A2 at node 18 where it is further heated before entering anode supply region 230 of EATR 200 at node 19. The gas mixture is thus preferably heated eventually to near the operating temperature of EATR 200. The presence of the carrier gas allows the hydrogen partial pressure at node 19, and therefore in anode supply region 230, to be low compared to the hydrogen partial pressure in ATR 210, which is necessary for hydrogen from ATR 210 to cross membrane layer 220 into anode supply region 230 by virtue of a hydrogen concentration or partial pressure gradient.

The hydrogen produced by EATR 200 joins with the gas mixture returning from EHC 100 before entering heat exchanger D1/D2 at node 20 where heat is removed from the mixture. More heat is removed from the mixture by heat exchanger CU so that the mixture entering anode section 110 at node 22 is cooled near the operating temperature of EHC 100. The hydrogen produced by EATR 200 is thus transported via anode gas loop 300 to EHC 100. The hydrogen in anode section 110 is stripped of its electrons by external power source 140. The resulting protons pass through electrolyte 120 on their way to cathode section 130 where they recombine with associated electrons from external power source 140 to form molecular hydrogen. This hydrogen formed at cathode section 130 can be released from cathode section 130 at any pressure in the manner described previously, with reference to FIG. 1.

A coolant, which may be air or liquid, enters a cooler 150 via nodes 26 and 27 to cool EHC 100. The coolant leaves cooler 150 via node 28, traveling to condenser 280, where the coolant is used to provide cooling capacity for condenser 280, since the coolant is cool relative to the exhaust gases from burner 260. If the coolant is air, it is exhausted via node 29. If the coolant is liquid, a closed loop (not shown) is preferably installed so that the coolant can be reused.

The water removed from the exhaust of burner 260 is pumped from condenser 280 at node 31 by pump 270 and fed to boiler 160 at node 32. Pump 270 is preferably a conventional circulation pump unless ATR 210 is run at high pressure. EATR 200 functions properly as long as a sufficient hydrogen partial pressure gradient exists between ATR 210 and anode supply region 230. As described above, this pressure gradient is maintained by the action of anode gas loop 300. In an alternate arrangement, ATR 210 is run at high pressure. High pressure considerations include using a positive displacement pump in place of the conventional circulation pump 270, compressing the fuel air between nodes 4 and 5, and optionally adding a pressure step-down between nodes 9 and 10. In a suitably large system, a gas turbine between nodes 9 and 10 would provide the required pressure step-down function, with the mechanical energy produced by the turbine used to power an air compressor (not shown) between nodes 4 and 5.

The presence of the carrier gas allows anode loop 300 to operate at a hydrogen partial pressure gradient between the anode supply region 230 of the EATR 200, where hydrogen is supplied, to EHC anode section 110, where hydrogen is consumed, while keeping the total pressure high in anode gas loop 300. EHC anode section 110 is not overly sensitive to the hydrogen partial pressure as long as contaminants, such as carbon monoxide are not present. Using water vapor or steam as the carrier is preferable since the presence of water in anode gas loop 300 is advantageous if the water is made to condense on the cold side of anode loop 300 (D1 and CU) and evaporate on the hot side of anode gas loop 300 (D2 and A2). In this way, the partial pressure of hydrogen in node 19 entering the EATR anode supply region 230 can be much lower than the hydrogen partial pressure in EHC anode section 110.

As described above, having a higher partial pressure in ATR 210 than in anode supply region 230 permits hydrogen to cross the membrane layer 220 from ATR 210 to anode supply region 230. When the hydrogen partial pressure is higher in anode supply region 230 than in ATR 210, hydrogen crosses membrane layer 220 in reverse; that is in a direction from anode supply region 230 to ATR 210. Monitoring the temperature of the exhaust from burner 260 at node 14 exploits this fact. Decreasing the amount of hydrogen released from cathode section 130 causes an instantaneous increase in the hydrogen partial pressure in anode gas loop 300. A sufficient increase in partial pressure of the hydrogen in anode supply region 230 causes hydrogen to move through EATR 200 in reverse, moving from anode supply region 230 to ATR 210, until the hydrogen partial pressures across membrane layer 220 are equal. When the hydrogen partial pressures across membrane 220 are equal, no hydrogen concentration exists and hydrogen transport across the membrane layer 220 ceases. Reformed hydrogen thus leaves ATR 210 via node 9 and enters burner 260, thereby causing a temperature increase at node 14. This temperature increase signals a need to decrease the fuel supply at node 1. Conversely, increasing the amount of hydrogen released from EHC's cathode section 130 causes the burner temperature to drop, as monitored at node 14 and thereby signaling the need to increase the fuel supply. Setting up a monitor and feedback loop to increase or decrease the fuel supply is considered to be within the ability of one skilled in the art, therefore no further details are required.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hydrogen production plant, comprising
   an electrochemical autothermal reformer for use in conjunction with an electrochemical hydrogen compressor;
   said electrochemical hydrogen compressor including a compressor anode section and a compressor cathode section;
   said electrochemical autothermal reformer including an autothermal reformer region, a mixed ion conductor membrane or metal or metal alloy membrane and an anode supply region, said membrane separating said autothermal reformer region from said anode supply region; and
   circulating means for circulating a hydrogen and carrier gas mixture between said compressor anode section and said reformer anode supply region.

2. A hydrogen production plant according to claim 1, wherein said electrochemical hydrogen compressor is one of a proton exchange membrane type electrochemical hydrogen compressor, a phosphoric acid type electrochemical hydrogen compressor, an alkaline type electrochemical hydrogen compressor, a solid oxide type electrochemical hydrogen compressor, and a molten carbonate type electrochemical hydrogen compressor.

3. A hydrogen production plant according to claim 1, further comprising:
   burning means for exhausting and burning excess hydrogen from said autothermal reformer region; and
   fuel feeding means, responsive to said burning means, for feeding hydrocarbon fuel to said autothermal reformer region.

4. A hydrogen production plant according to claim 3, further comprising:
   air feeding means for feeding an air and steam mixture to said autothermal reformer region;
   steam producing means, connected to said air feeding means, for producing said steam; and
   a first heat exchanger between said output of said burning means and said steam producing means.

5. A hydrogen production plant according to claim 4, further comprising:
   temperature increasing means for increasing a temperature of said hydrogen and carrier gas mixture as said hydrogen and carrier gas mixture circulates in a first path from said compressor anode section to said reformer anode supply region; and
   temperature decreasing means for decreasing a temperature of said hydrogen and carrier gas mixture as said hydrogen and carrier gas mixture circulates in a second path from said reformer anode supply region to said compressor anode section.

6. A hydrogen production plant according to claim 5, wherein said increasing temperature means and said decreasing temperature means together form a second heat exchanger.

7. A hydrogen production plant according to claim 6, further comprising a third heat exchanger between an output of said burning means and said hydrogen and carrier gas mixture in said first path.

8. A hydrogen production plant according to claim 7, further comprising a fourth heat exchanger between said output of said burning means and said hydrogen and carrier gas mixture of air and steam in said air feeding means.

9. A hydrogen production plant according to claim 8, further comprising a fifth heat exchanger between said hydrogen and carrier gas mixture in said second path and a point outside said production plant.

10. A hydrogen production plant, comprising
    an electrochemical autothermal reformer for use in conjunction with an electrochemical hydrogen compressor;
    said compressor including a compressor anode section and a compressor cathode section;
    said electrochemical autothermal reformer including an autothermal reformer region, a mixed ion conductor membrane or metal or metal alloy membrane, and an anode supply region, with said membrane separating said autothermal reformer region from said anode supply region; and
    circulating means for circulating a mixture of hydrogen and a carrier gas between said compressor anode section and said reformer anode supply region;

burning means for exhausting and burning excess hydrogen from said autothermal reformer region;

fuel feeding means for feeding hydrocarbon fuel to said autothermal reformer region; and control means, responsive to said burning means, for controlling said fuel feeding means.

* * * * *